Patented June 18, 1940

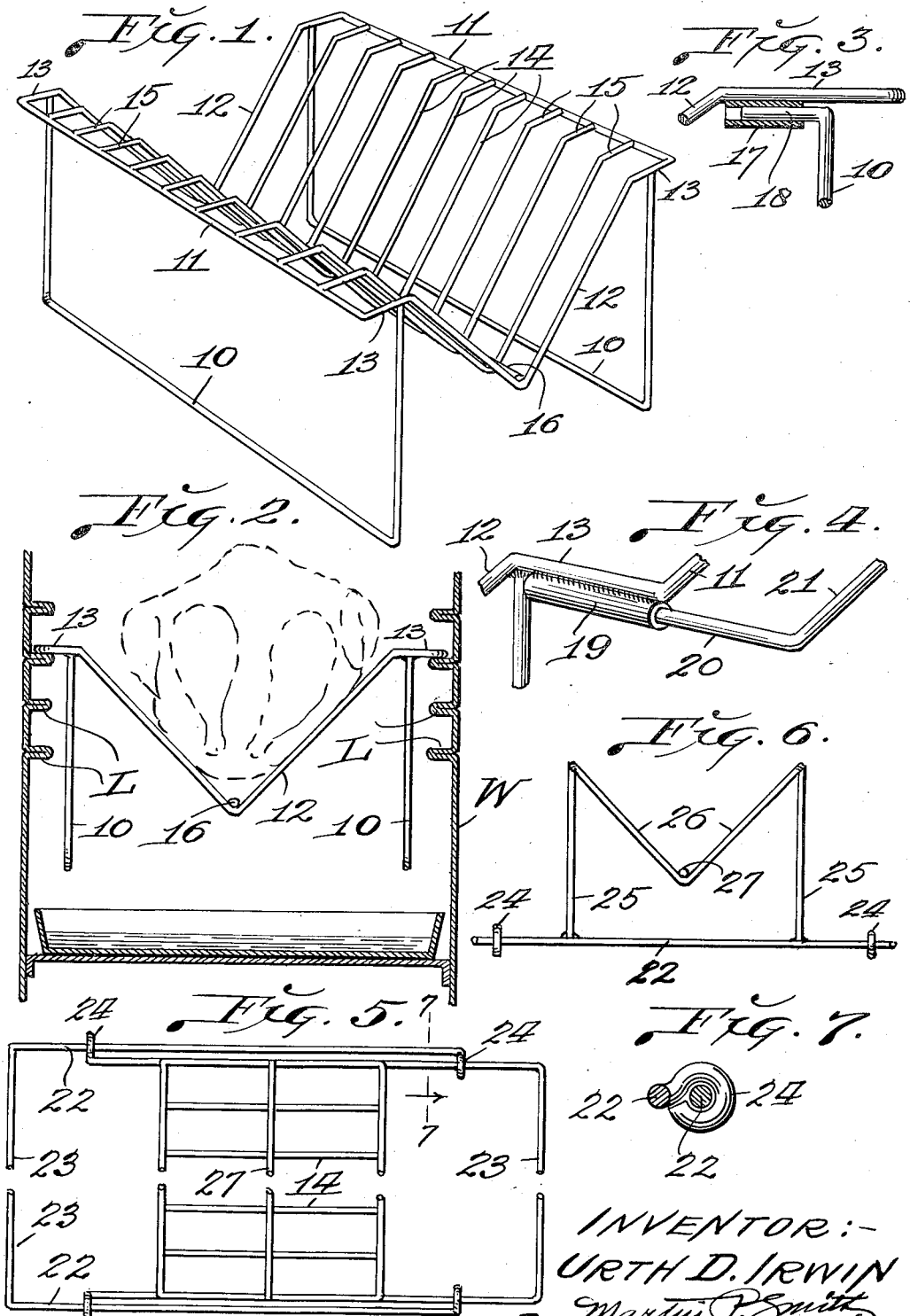

2,205,064

UNITED STATES PATENT OFFICE 2,205,064

ROASTING RACK

Urth D. Irwin, Los Angeles, Calif.

Application October 15, 1938, Serial No. 235,198

8 Claims. (Cl. 53—5)

My invention relates to a rack, particularly designed for supporting turkeys, roasts of meat, and the like, while the same are being roasted in the oven of a stove, range, or other cooking appliance, and the principal objects of my invention are, to provide a rack of firm, substantial and durable structure that is adapted to receive and hold roasts at various heights within the oven, depending upon the degree of heat utilized in the roasting process and further, to provide a roasting rack that may be adjusted so as to fit conveniently in ovens of different sizes.

A further object of my invention is, to provide a roasting rack having detachable supporting legs or frames, thus enabling the complete rack to be packed into comparatively small space for storage or transportation.

A further object of my invention is, to provide a roasting rack that may be easily and conveniently positioned within or removed from the oven and further, to construct the rack so that the portion which receives the roast is at all times elevated from the bottom of the oven or the drip receiving pan that is positioned in the oven below the rack, thus providing for a free circulation of heat entirely around and beneath the roast and, consequently enabling the same to be uniformly cooked.

With the foregoing and other objects in view, my invention consists in certain novel features of construction and arrangement of parts that will be hereinafter more fully described and claimed and illustrated in the accompanying drawing in which:

Fig. 1 is a perspective view of a roasting rack constructed in accordance with my invention.

Fig. 2 is a vertical cross section of an oven structure having supporting rails or flanges on its side walls and showing my improved rack positioned in said oven.

Fig. 3 is a detail elevational view of the upper corner of a modified form of the rack wherein the rack supporting legs or frames are detachably applied to the main part of the rack.

Fig. 4 is a detail perspective view showing a modified form of the rack having extensible side members.

Fig. 5 is a plan view of a modified form of the rack having an extensible base.

Fig. 6 is a side elevational view of the form of rack illustrated in Fig. 5.

Fig. 7 is an enlarged detail section taken on the line 7—7 of Fig. 5.

Referring by numerals to the accompanying drawing and particularly to the form of rack illustrated in Figs. 1 and 2, 10, 10 designate substantially U-shaped members which form the upright supports or legs for the rack, said members being constructed from heavy wire or light weight metal rods.

The meat or fowl supporting portion of the rack comprises a substantially rectangular frame formed of wire or the like and comprises spaced parallel side members 11 and end members that have their intermediate portions extended downwardly to form substantially V-shaped members 12. Short portions 13 of the wire forming the end members between the upper ends of the V-shaped portions 12 and the ends of the side members 11 are horizontally disposed and, the upper ends of the vertical legs of the frame members 10 are connected, preferably by welding, to the under sides of said members 13 at points inset from the members 11.

The construction just described enables the members 11 and the outer portions of the short horizontally disposed members 13 to function as flanges or extensions along the upper edges of the sides of the frame and which flanges are adapted to rest on the ledges such as L that project from the side walls W of conventional ovens (see Fig. 2).

Arranged in spaced relation between the V-shaped members 12 are V-shaped members 14 formed of wire and, projecting outwardly from the upper ends of said V-shaped members are short horizontally disposed arms 15, the outer ends of which are secured, preferably by welding, to the side members 11 of the rack.

To add rigidity to the skeleton rack constructed as described, a longitudinally disposed member 16 of heavy wire or light weight metal rod is positioned in the extreme lower portions of the V-shaped members 12 and 14 and secured thereto, preferably by welding.

Thus a strong and substantial skeleton rack is provided which is adapted to receive turkeys, roasts of meat, and the like, and support the same at different elevations in an oven during the roasting process.

The rack may be positioned in the oven with the side members 11 and the members 13 and 15 resting upon the ledges that project inwardly from the side walls of the oven or, the rack may be positioned in the oven with the lower members 10 of the supporting frames resting on the bottom of the oven.

In either position, the supported roast is held a substantial distance above the bottom of the oven so that the heated air within the oven may circulate freely around and beneath the roast, thus insuring uniform cooking.

In the modified construction illustrated in Fig. 3, short tubes 17, preferably of metal, are secured to the under sides of the inner portions of the members 13 at the ends of the rack and these tubes are adapted to receive, in differently adjusted positions, the horizontally disposed upper end portions 18 of the vertical members of the supporting frames 10.

This construction enables the frames 10 to be detached from the main body of the rack, so that the complete rack in knocked-down form will occupy comparatively little space when packed for storage or transportation.

In the modified construction illustrated in Fig. 4, tubes 19 of metal are secured to the under sides of the members 13 and, adjustably seated in said tubes are the end members 20 of auxiliary side frames or rails 21, said end portions 20 being disposed at right angles to the rail or member 21. This construction provides adjustable side members which may be moved inward or outward so as to engage on the ledges that project inwardly from the sides of wide ovens.

In the modified construction illustrated in Figs. 5 to 7 inclusive, the base of the rack is composed of two horizontally disposed U-shaped frames constructed of wire or the like and each frame comprising a pair of parallel side members 22 and an end member 23. One of these base members is slightly narrower than the other so that its side members 22 are positioned inside and immediately adjacent the side members of the other frame and, the two frames are telescopically connected by means of loops 24 that are formed on the ends of the side members 22 and said loops being disposed at right angles to said side members and encircling the side members of the adjacent frame (see Fig. 7).

Secured to either pair of side members 22, preferably the inner pair, are the lower ends of the legs 25 of inverted U-shaped frames and, connected to the horizontal rails of said inverted U-shaped frames are the ends of a series of V-shaped members 26 formed of wire and which provide a support for the turkey or meat to be roasted. Connecting the lower ends of the V-shaped frames 26 is a reinforcing and strengthening wire or rod 27.

The form of rack just described is extensible laterally so that it may be used in ovens of different widths.

Thus it will be seen that I have provided a rack particularly designed for the roasting of turkeys and other fowl, also for roasts of meat, which rack is of strong durable construction and when the rack is supported by the ledges on the side walls of an oven or by the bottom of the oven, the meat that is being roasted is maintained a substantial distance above the bottom of the oven so as to insure even distribution of the heat around the roast and the consequent uniform roasting thereof.

My invention also contemplates the provision of a rack constructed so that it may be adjusted in order that it may be conveniently used in ovens of different sizes.

It will be understood that minor changes in the size, form and construction of the various parts of my improved roasting rack, may be made and substituted for those herein shown and described, without departing from the spirit of my invention, the scope of which is set forth in the appended claims.

I claim as my invention:

1. A roasting rack comprising a pair of upright supporting frames, a substantially rectangular frame connected to the upper portions of said supporting frames, the side portions of said rectangular frame projecting laterally beyond the vertical planes occupied by the supporting frames, the intermediate portions of the end members of said rectangular frame being substantially V-shape and a series of substantially V-shaped members arranged in spaced relation between the ends of the rectangular frame with the ends of said V-shaped members secured to the side members of said rectangular frame.

2. A roasting rack as set forth in claim 1, with a reinforcing rail secured to the lower portions of said V-shaped members and to the lower portions of the V-shaped end members of said rectangular frame.

3. A roasting rack comprising a frame including parallel side members and parallel end members, the intermediate portions of said end members being V-shaped, a plurality of V-shaped members arranged in spaced relation between the V-shaped portions of the end members of said frame, with the outer ends of said spaced V-shaped members connected to the side members of the frame and substantially upright supporting members secured to the end portions of the end members of said frame.

4. A roasting rack as set forth in claim 3 and with a reinforcing member connecting the lower ends of all of the V-shaped members.

5. In a roasting rack, a skeleton structure including a substantially rectangular frame and a series of substantially V-shaped members arranged in spaced relation between the ends of said frame with the ends of said V-shaped members connected to the sides of the frame and supporting members detachably connected to the corners of said frame.

6. A roasting rack as set forth in claim 5 and with a reinforcing member connecting the lower portions of all of said V-shaped members.

7. A roasting rack comprising a longitudinally extensible base formed in two parts, each including a pair of parallel side rails, a substantially rectangular frame supported by said base, said frame including pairs of vertically disposed legs with said pairs of legs connected respectively to the side members of one of the members of said base and a series of V-shaped members arranged in spaced relation and connected to the side members of said rectangular frame.

8. A roasting rack as set forth in claim 7 and with a reinforcing rod connecting the lower ends of said V-shaped members.

URTH D. IRWIN.